(12) United States Patent
Hollar

(10) Patent No.: US 7,124,114 B1
(45) Date of Patent: Oct. 17, 2006

(54) METHOD AND APPARATUS FOR DETERMINING DIGITAL A/V CONTENT DISTRIBUTION TERMS BASED ON DETECTED PIRACY LEVELS

(75) Inventor: Mark A. Hollar, Palo Alto, CA (US)

(73) Assignee: Macrovision Corporation, Santa Clara, CA (US)

(*) Notice: Subject to any disclaimer, the term of this patent is extended or adjusted under 35 U.S.C. 154(b) by 794 days.

(21) Appl. No.: 09/711,000

(22) Filed: Nov. 9, 2000

(51) Int. Cl.
H04L 9/00 (2006.01)

(52) U.S. Cl. .............................. 705/51; 705/57; 705/59

(58) Field of Classification Search ................. 705/26, 705/51, 59, 75, 76, 57, 58; 713/176, 175, 713/177; 725/104, 25; 380/202, 203
See application file for complete search history.

(56) References Cited

U.S. PATENT DOCUMENTS

| | | | |
|---|---|---|---|
| 5,613,004 A | | 3/1997 | Cooperman et al. |
| 5,892,900 A | * | 4/1999 | Ginter et al. ............... 713/200 |
| 6,115,818 A | | 9/2000 | Barton |
| 6,374,036 B1 | * | 4/2002 | Ryan et al. ................... 386/94 |
| 6,381,747 B1 | * | 4/2002 | Wonfor et al. .............. 725/104 |
| 6,405,203 B1 | * | 6/2002 | Collart ......................... 707/10 |
| 6,438,235 B1 | * | 8/2002 | Sims, III .................... 380/285 |
| 6,647,417 B1 | * | 11/2003 | Hunter et al. ............... 709/225 |
| 6,885,748 B1 | * | 4/2005 | Wang ......................... 380/201 |

FOREIGN PATENT DOCUMENTS

| | | |
|---|---|---|
| JP | 10-191036 | 7/1998 |
| JP | 2000-106627 | 4/2000 |
| JP | 2004070573 | * 3/2004 |
| WO | WO 00/63861 | 10/2000 |
| WO | WO 00/70523 | 10/2000 |
| WO | WO02/29510 | 4/2002 |

OTHER PUBLICATIONS

PCT Search Report for PCT/US01/31325 dated Nov. 25, 2002, 1 page.
Patent Abstract of Japan for JP10-191036 published Jul. 21, 1998, 1 page.
Patent Abstract of Japan for JP2000-106627 published Apr. 11, 2000, 1 page.

* cited by examiner

Primary Examiner—Elisca Pierre Eddy
(74) Attorney, Agent, or Firm—Victor Okumoto

(57) ABSTRACT

A distribution server distributes A/V content to a recipient according to terms determined from information stored in a database of prior unauthorized copying attributed to that recipient. The copy distributed to the recipient includes identifications of the content and recipient embedded in it by an ID embedder employing a steganographic or watermarking technique. A detection server detects embedded ID's in A/V content sampled from various distribution channels, and provides the ID information to the distribution server to update the database of prior unauthorized copying.

73 Claims, 12 Drawing Sheets

METHOD AND APPARATUS FOR DETERMINING DIGITAL A/V CONTENT DISTRIBUTION TERMS BASED ON DETECTED PIRACY LEVELS

FIELD OF THE INVENTION

The present invention generally relates to the distribution of copyrighted material and in particular, to a method and apparatus for determining digital audio-visual ("A/V") content distribution terms based on detected piracy levels.

BACKGROUND OF THE INVENTION

The unauthorized copying and distribution (also referred to herein as "piracy") of audio-visual content such as motion pictures, music, the spoken word, photos or printed text has and continues to be a major problem for owners of such content. For example, the Recording Industry Association of America ("RIAA") has asserted that physical goods piracy costs the United States recording industry alone hundreds of millions of dollars a year, and around the world, many billions of dollars annually.

With the advent of the Internet and the growing popularity of digital A/V content, the problem of piracy has grown to new dimensions. The availability of these and other new technologies have made the problem of unauthorized copying so pervasive that virtually anyone owning a personal computer or Internet appliance can be a participant in copyright infringement. Under such circumstances, the rights of copyright owners are increasingly being violated and their rightful profits lost.

Audio Distribution

Music type A/V content, for example, is easily generated today from audio compact disc ("CD") using "ripper" software. As shown in FIG. 1, to generate A/V content 104, original audio on a CD 101 is played on an optical drive 102 and CD "ripper" software 103 creates the digital A/V content 104 from the output of the optical drive 102. Preferably, the A/V content 104 is in the form of a computer file in the MP3 format. A/V content 104 created in this way is a quite accurate representation of the original audio. Once created, it is an easy matter to transfer the A/V content 104 over the Internet 111 to other parties without the receiving parties paying for the rights to the audio. For example, the growth of online music communities, such as can be found at www.napster.com, or formed as a Gnutella community through software made available at www.gnutella.wego.com, facilitate a viral-type spread of audio content as music consumers browse and transfer content freely and easily between themselves without compensation to the content owners.

FIG. 1 illustrates an example of a Napster virtual network 100. A list server computer 105 has a memory 106 storing list data 107 that includes the identities of consumer client computers currently on-line, the music or other A/V content available from each consumer client computer, and the Internet connection speed associated with each consumer client computer. In this example, consumer client computers 108, 109 and 110 are currently on-line, having contacted and made a connection with the list server computer 105 over the Internet 111. Consumer client computers 108, 109 and 110 interact with the list server computer 105 in a classic client-server relationship to access the list data 107 over the Internet 111. This allows operators of consumer client computers 108, 109 and 110 to then select which music and from which other consumer client computer to transfer music from. For example, as depicted by dotted lines in FIG. 1, if the operator of consumer client computer 109 has selected A/V content 104 to download from consumer client computer 108, then consumer client computer 109 interacts with consumer client computer 108 in a client-server type manner to transfer a copy of the A/V content 104 to its memory 113.

In the case of Napster-type sites such as depicted in FIG. 1, the list server 105 doesn't actually store music, nor does the music ever actually transit through the list server 105 or its memory 106. The list server 105 does maintain the centralized data list 107, however, and consequently, the person or entity that generates the centralized data list 107 on the list server 105 may be subject to legal liability. To avoid the visibility that the centralized data list serving entity provides, other methods for transferring music between cooperating parties have been devised. One such method is the Gnutella community approach.

FIG. 2. illustrates an example of a Gnutella virtual network 200. In this case, there is no list server. Each of the consumer computers 201, 202, 203 and 204 may act as either a client or a server, depending upon whether it is receiving music from or transferring music to another consumer computer. When running the Gnutella application software, each of the consumer computers 201, 202, 203 and 204 maintains a list of other consumer computers that it knows the IP address of in the Gnutella virtual network 200. A special feature of the Gnutella application software is that each of the consumer computers 201, 202, 203 and 204 need only know the IP address of one other consumer computer in the Gnutella virtual network 200 to provide access to all consumer computers 201, 202, 203 and 204 in the Gnutella virtual network 200. Each of the consumer computers 201, 202, 203 and 204 is then able to submit search queries to the Gnutella virtual network 200 and receive search results. Thus, when an operator of one of the consumer computers 201, 202, 203 and 204 finds a piece of music that he or she desires to obtain, they can indicate this to the Gnutella application software, and the Gnutella application software facilitates a direct transfer from a consumer computer including such music to the requesting consumer computer through the Internet 205. As an example, the solid lines between the consumer computers 201, 202, 203 and 204 and the Internet 205 are representative of the transfer of search queries and search results between the consumer computers 201, 202, 203 and 204. The dotted lines, on the other hand, are representative of an actual transfer of a copy of music 214 from the consumer computer 203 to the consumer computer 204 through the Internet 205 after the operator of consumer computer 204 has made a selection of that music.

FIG. 3 illustrates an example of a coupling diagram for the Gnutella virtual network 200 where Alice, Charlie, Eve and Bob are pseudonyms for consumer computers 201, 202, 203 and 204 respectively. In the example, Alice knows that Charlie is coupled to the Gnutella virtual network 200 (i.e., Charlie is on-line) since she knows his IP address, but does not know that Eve and Bob are coupled to the Gnutella virtual network 200; Charlie knows that Alice and Eve are coupled to the Gnutella virtual network 200 (i.e., Alice and Eve are online) since he has their IP addresses, but does not know that Bob is coupled to the Gnutella virtual network 200; Eve knows that Bob and Charlie are coupled to the Gnutella virtual network 200 (i.e., Bob and Charlie are on-line) since she knows their IP addresses, but does not know that Alice is coupled to the Gnutella virtual network 200; and Bob knows that Eve is coupled to the Gnutella virtual network 200 (i.e., Eve is on-line) since he knows her IP address, but does not know that Alice and Charlie are coupled to the Gnutella virtual network 200. As can be appreciated, since Alice, Charlie, Eve and Bob do not know the identities of all other consumer computers coupled to the Gnutella virtual network 200, the Gnutella application software provides protective anonymity to the unknown consumer computers shielding them from detection and possible prosecution for copyright infringement.

There have been initiatives to create secure environments for the download, distribution and listening of digital music from the Internet from groups such as the Secure Digital Music Initiative (SDMI). This system uses encryption to control access to music content and watermarks or embedded data to control equipment (either to control recording or control playback) once the content has been decrypted. This system has the disadvantage that it requires introduction of a completely new class of portable music player devices before it is effective. If these devices prove to be unacceptable in the marketplace, then the SDMI system is ineffective and does nothing to encourage consumers to purchase legal copies of digital A/V content versus continuing to rip and transfer music derived from CD's.

Theatrical Presentation

Movie content owners obtain a significant portion of their return on investment in the production of a movie during the theatrical release. The theatrical release precedes the release to other channels such as in-flight entertainment, cable TV pay-per-view channels or videotape in order to maximize the return on the investment. Content distributed illegally during the theatrical release represents a reduction in the content owner's early rate of return. With current film-based theatrical presentation, the use by pirates of a camcorder in a theater provides the primary mechanism for obtaining movie content during the theatrical release window.

The introduction of digital content into theater operations allows for the use of automation systems in theaters. A theater automation system allows a theater owner to operate his facility with a smaller staff size, to more rapidly ramp up and ramp down the number of screens available for any particular piece of content, and to provide for an overall improvement in the efficiencies of his operations. These theater automation systems also allow the theater operator to rapidly communicate box office information to the distributor thus allowing the distributor and eventually the copyright holder to operate more efficiently.

FIG. 4 illustrates an example of a digital theater system 400 that allows for the distribution of movies in a high quality digital form. A distribution server 401 distributes the movies to a theater client 402 through a secure transmission path 403 using satellite or fiber optic, or alternatively, by optical or magnetic media (not shown). The projection of the movie content in a digital theater is likely to provide a superior picture quality compared to film thus making the movie displayed in this venue more desirable as the source for a movie pirate's operation. The distribution server 401 transmits encrypted content through the transmission path 403 (or alternatively, the media) to enhance the content's security, and the theater client 402 has a decrypter 404 for decrypting the movie before sending it to a projector 405 for display on a theater screen 406. Despite such protection, however, there are various points where the movie content is available in an insecure form. For example, a pirate camcorder 407 might record the movie playing on the theater screen 406 so that the recorded movie may be distributed through pirate distribution channels 408. As another example, other points of vulnerability to pirating may be the interface between a playback device (not shown) and the projector 405 or some point within the projector 405.

Generally, a theater operator is under some obligation to the content owner to attempt to limit his customer's attempts to illegally make copies with a camcorder within his theater. Obviously, he is also obligated to ensure that his employees who have access to movie content adhere to the law. As such, a copyright owner can legitimately argue that a theater which is a source of pirated movies should be obliged to compensate the copyright owner appropriately if that theater is a source of pirated content.

Post-Production

The current process for producing a movie entails the distribution of tasks among a large number of employees and contractors. As depicted in FIG. 5, with the rapid increase in the capability of computers and networks, such a process often involves the distribution of pieces of a movie or other A/V content from a central publisher computer 501 out to contractor computers 502, 503 and 504 to provide for a distributed work environment 500. This distributed work environment improves the efficiency of the production process but also makes a greater portion of the A/V content 506 vulnerable to copying or inappropriate re-distribution through pirate distribution channels 513. Piracy from the post-production work environment can sometimes even result in pirated movies hitting the street prior to theatrical release. Again, this negatively impacts the content owner's revenue stream.

OBJECTS AND SUMMARY OF THE INVENTION

Accordingly, it is an object of the present invention to provide a method and apparatus for distributing A/V content and other protected material that compensates in some fashion rights holders of such material against losses incurred by unauthorized copying of the protected material.

Another object is to provide a method and apparatus for generating a database of unauthorized copying of protected material for use in a method or apparatus for distributing A/V content and other protected material.

These and additional objects are accomplished by the various aspects of the present invention, wherein briefly stated, one aspect is a computer implemented method for distributing protected material. The method comprises ascertaining terms for providing a protected material to a prospective recipient according at least in part to information of unauthorized copying of other protected material previously provided to the prospective recipient; and providing or withholding a copy of the protected material to the prospective recipient in accordance with the terms.

Another aspect is an apparatus for distributing protected material. The apparatus includes a computer having a first set of program code. The first set of program code serves to ascertain terms for providing a protected material to a prospective recipient according at least in part to information of unauthorized copying of other protected material previously provided to the prospective recipient. The first set of program code also thereupon serves to provide or withhold a copy of the protected material to or from the prospective recipient in accordance with the terms.

Another aspect is a computer implemented method for generating a database of unauthorized copying of protected material. The method comprises: detecting at least one identification embedded in a copy of protected material procured from a distribution channel; and storing information of the protected material according to the at least one identification in a database so as to be indicative of unauthorized copying of the protected material.

Another aspect is an apparatus for generating a database of unauthorized copying of protected material. The apparatus includes a computer having a first set of program code. The first set of program code serves to detect at least one identification embedded in a copy of protected material procured from a distribution channel, and store information of the protected material according to the at least one identification in a database so as to be indicative of unauthorized copying of the protected material.

Still another aspect is an system for distributing protected material, and detecting unauthorized copying of such material. The system includes a detection server having a first program for detecting identifications embedded in copies of protected materials procured from at least one distribution channel, and storing information of the protected materials according to the identifications in a database so as to be indicative of unauthorized copying of the protected material. The system also includes a distribution server having a second program for ascertaining terms for providing a copy of a protected material to a prospective recipient according at least in part to the information in the database, and providing or withholding a copy of the protected material to the prospective recipient in accordance with the terms.

Additional objects, features and advantages of the various aspects of the present invention will become apparent from the following description of its preferred embodiments, which description should be taken in conjunction with the accompanying drawings.

DETAILED DESCRIPTION OF THE PREFERRED EMBODIMENT

As used herein: the terms "material" and "content" may be used interchangeably; "audio-visual content" or "A/V content" includes motion pictures, music, the spoken word, photos or printed text; "protected material" means material protected by contract or intellectual property law, and includes A/V content; "recipient" means a party or a computer that has received protected material; "prospective recipient" means a party or a computer that has requested protected material; and "computer" includes a workstation, a personal computer, an information appliance, a set top-box, and any other connected device having bi-directional communications capability.

Distribution Server

Figure 6:
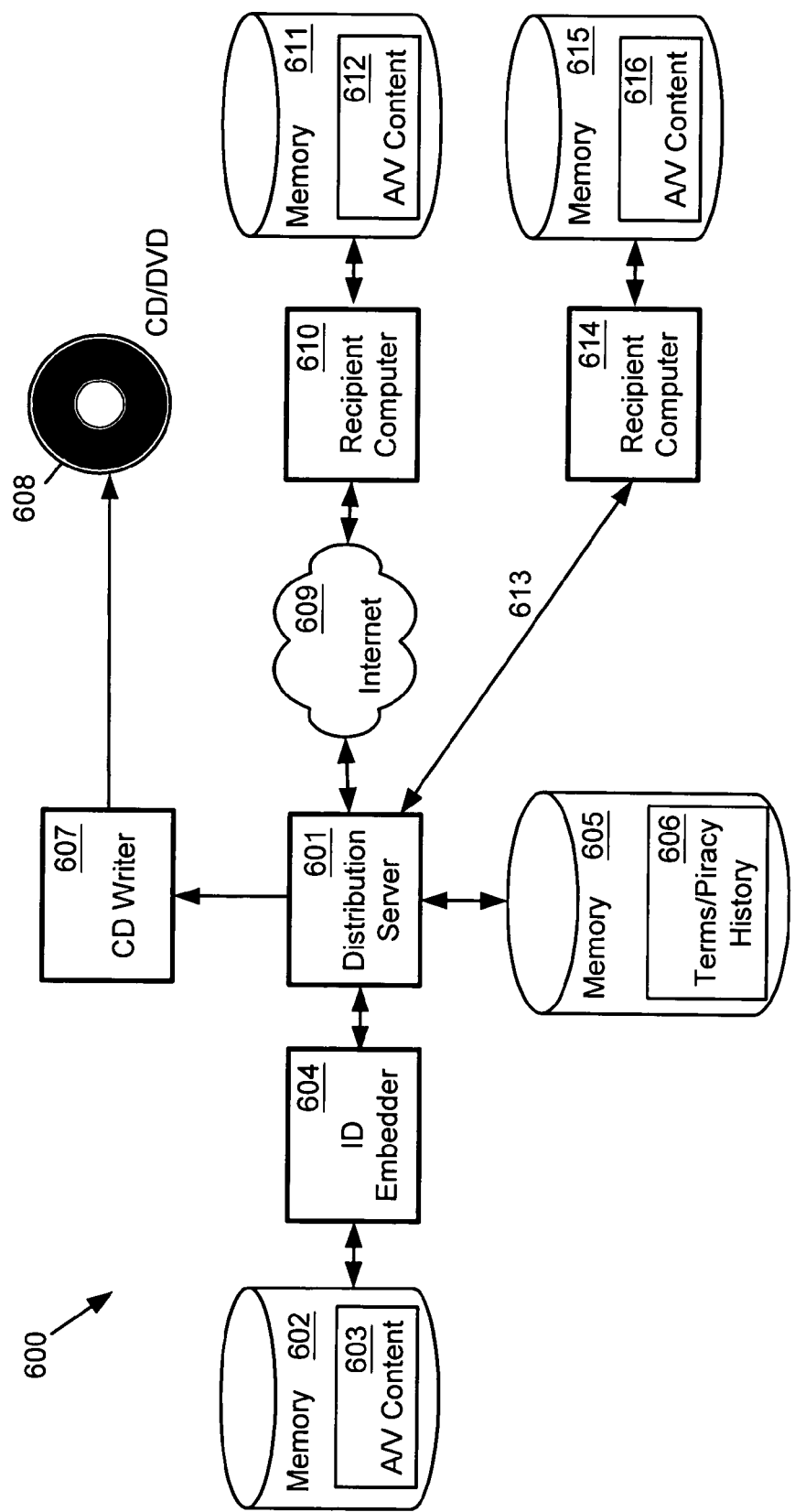
FIG. 6 illustrates, as an example, a block diagram of a distribution server system for directly distributing A/V content, utilizing aspects of the present invention.

FIG. 6 illustrates a distribution server system 600 for directly distributing A/V content 603. Three distribution means are depicted—tangible media such as compact disc ("CD") or digital versatile disc ("DVD") 608, the Internet 609, and a direct line connection 613. In a given application of the distribution server system 600, any one, two or all three of these distribution means may be employed. Also depending on the application, the A/V content 603 may take different forms such as one or more movies, one or more music recordings, one or more publications, or combinations of such different forms. The tangible media may also take different forms such as magnetic disk or tape, or any other tangible media upon which A/V content can be stored for future playback.

As an example, in a music distribution application, consumers may download selections of music recordings stored in memory 602 as A/V content 603 through the Internet 609. As another example, in a digital theater application, some theater clients may receive selections of movies stored in memory 602 as A/V content 605 through the direct line connection 613. Alternatively, other theater clients may receive selections of movies through hard media such as DVD 608. As still another example, in a post-production or distributed work environment application, contractors may receive A/V content 603 for further processing or post-production work through any one of the distribution means.

Included in the distribution server system 600 are a distribution server computer 601 that processes requests for selections from the A/V content 603, a database 606 stored in memory 605 including terms of distribution and certain information regarding prospective recipients of the selections, and an identification ("ID") embedder 604 for embedding a content identification and a recipient identification on a copy of each selection prior to providing that copy to the recipient. A CD writer 607 is also included when a copy of the selection is provided on a CD.

Embedding of the content identification (e.g., a unique identification number for a selected musical recording, movie or publication) and the recipient identification (e.g., consumer credit card number, computer serial number, or network interface card IP address) by the ID embedder 604 is performed using a steganographic technique so as to deter removal of such information from the copy being provided. Steganographic techniques are especially useful for this purpose, because the embedded information is hard to detect, and attempts to remove such information generally result in severe degradation of the remaining material. Alternatively, watermarking techniques may also be used to embed the content and recipient identifications on the copy to be provided.

The database 606 may be given different names depending upon the application that the distribution server system 600 is being used for. For example, in applications where A/V content 603 is being leased or sold, it may be referred to as a "Price Structure" database. In applications involving contractors, it may be referred to as a "Bid Structure" database. Regardless of its name, the database 606 contains two basic types of information—algorithms or formulas for determining terms for providing a copy of the selected content from the A/V content 603, and information of unauthorized copying of other A/V content previously provided to recipients of such A/V content. This latter type of information is referred to as the recipient's "piracy history", and provides the basis for adjustment of the standard terms and conditions for a prospective recipient through the provided algorithm or formula. The adjustment could take the form, for example, of a discount to standard pricing for a good piracy history, a premium to standard pricing or complete withholding of a requested selection for a bad piracy history, or perhaps issuance of coupons for subsequent purchases or even awards of some other kind depending upon the prospective recipient's piracy history.

The recipient identification may take a number of different forms. Where a recipient computer such as 610 or 614 is used to communicate with the distribution server 601 to request and receive selections of the A/V Content 603, the recipient identification may be the unique serial number of the computer's microprocessor, or unique IP address associated with the computer's network interface card. Alternatively, the recipient identification may be associated with the operator of the recipient computer or the individual requesting the selection without the use of a computer. In such cases, a credit card number of the operator or the individual may be used for the recipient identification. Alternatively, electronic signatures or biometric information may be used for the recipient identification as use of such become accepted in electronic commerce.

The release of credit card information may potentially be viewed as less intrusive, and already a part of a consumer's normal e-commerce transaction psychology, then the collection of biometric information on the consumer or the serial number or IP address associated with the consumer's computer. While some consumers may be loathe to reveal their credit card information, a pricing differential based on their willingness to allow that information to be embedded in the received copy of their selection is also possible (i.e., allow the embedding of the information and obtain a discounted rate, or prohibit the embedding and pay a premium rate). To enhance privacy, an encrypted version of the credit card number or an index number or alias that is related to the purchaser's credit card number may alternatively be used as the recipient identification.

If a prospective recipient spoofs the identification of another, then subsequent detection of unauthorized copying for selections of A/V content 603 provided to the spoofing recipient could be wrongly attributed to the spoofed party. This would negatively impact the spoofed party while removing any impact to the spoofing recipient. To minimize such activity, a secure channel between the prospective recipient and the distribution server 601 is desirable. In addition, a means for the distribution server 601 to authenticate the identification of the prospective recipient would be necessary. Any one of a number of authentication protocols are available for this purpose (see, e.g., Schneier, Bruce, *Applied Cryptography: Protocols, Algorithms, and Source Code in C*, 2nd Edition, John Wiley & Sons, 1995).

Figure 7:
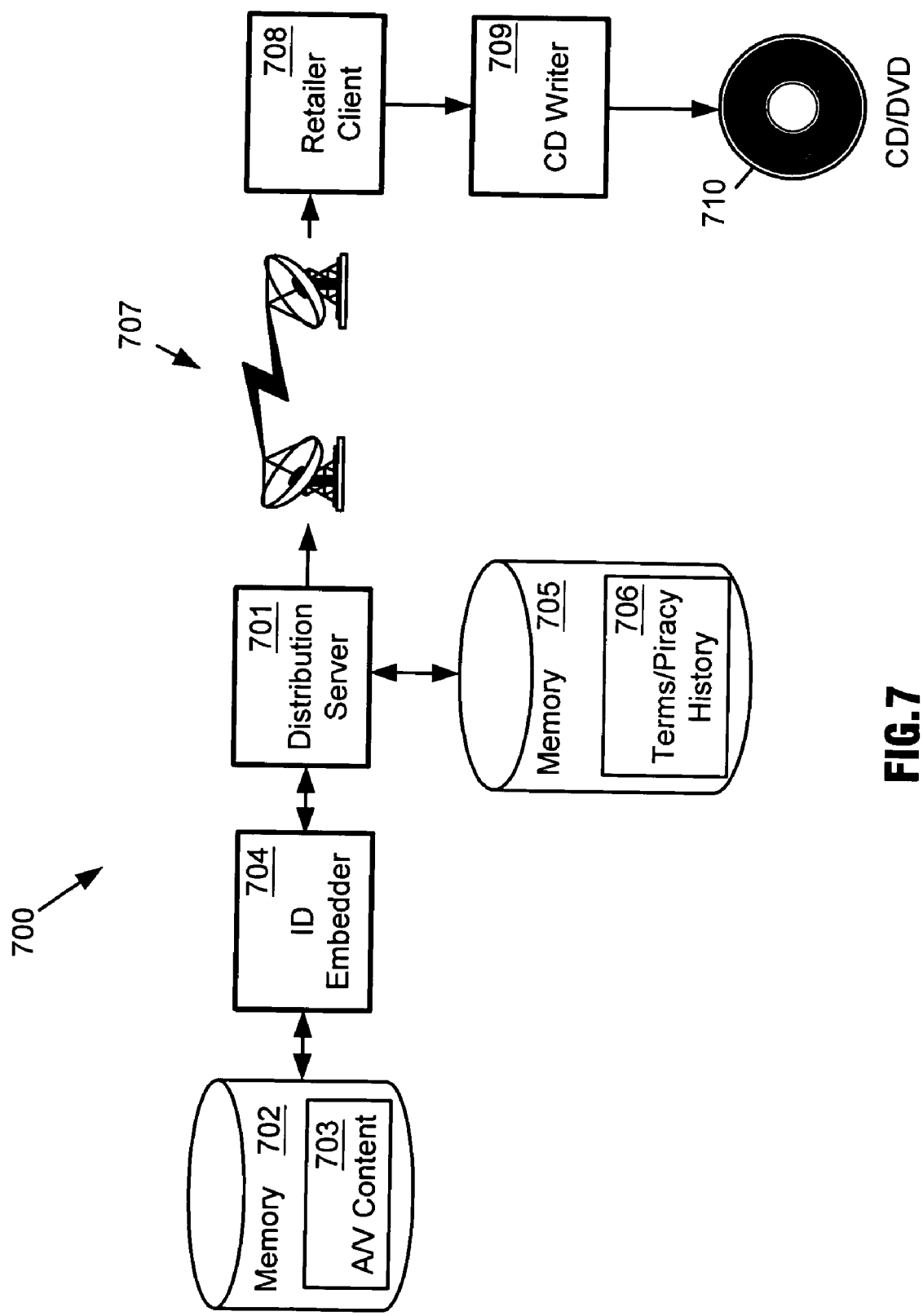
FIG. 7 illustrates, as an example, a block diagram of a distribution server system for indirectly distributing A/V content, utilizing aspects of the present invention.

FIG. 7 illustrates a distribution server system 700 for indirectly distributing A/V content 703. The distribution server system 700 is indirect, because the consumer purchases a CD 711 through a retail outlet rather than directly from the distribution server 701. As part of the purchasing process, a retailer client 708 transmits its identification, the identification of the purchaser, and the selection of A/V content 703 requested by the purchaser to the distribution server 701. The transmission is by direct line connection 707 which may be cable, ISDN, DSL or any other suitable high-speed transmission path. The distribution server 701 checks the piracy history of the retailer and the purchaser from its database 706, and transmits terms for the transaction based on those piracy histories back to the retailer client 708. The terms are generally determined from one or more formulas or algorithms stored in database 706 or some other part of memory 705 or memory 702.

If the purchaser accepts the transaction terms, then the retailer client 708 transmits a download request back to the distribution server 701. The distribution server 701 receives the request, and causes an ID embedder 704 to embed a content identification, the retailer identification and the purchaser identification in an electronic copy of the purchaser's selection from the A/V content 703. The embedding can be by a conventional steganographic or watermarking technique. The distribution server 701 then transmits the electronic copy back to the retailer client 708 over the high-speed transmission path 707. The retailer client 708 receives the electronic copy, and causes a CD writer 709 to generate the CD 710 from the electronic copy. The hard copy CD 710 with the embedded identifications is then sold to the purchaser in a conventional retail transaction.

Figure 8:
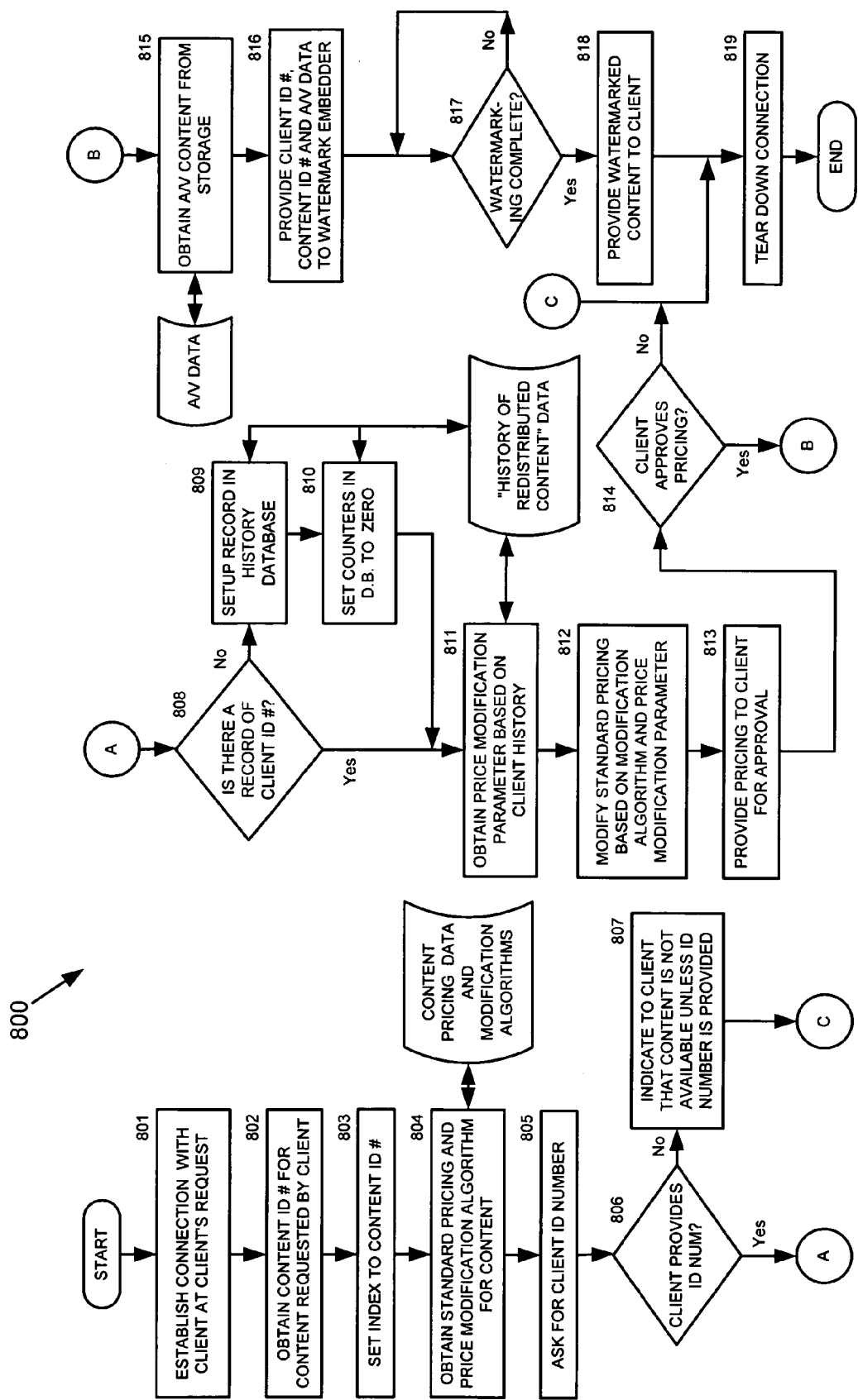
FIG. 8 illustrates, as an example, a flow diagram of a method of distributing protected material, utilizing aspects of the present invention.

FIG. 8 illustrates a flow diagram of a method 800 of distributing protected material. In 801, a distribution server computer such as 601 in FIG. 6 (simply referred to herein as "distribution server") establishes a connection with a client computer such as 610 or 614 in FIG. 6 (simply referred to herein as "client") at the client computer's request. The server and client are denoted as such in this example since they are establishing a conventional server-client relationship. In 802, the distribution server receives a content identification from the client for A/V content requested by the client. The content identification is in the form of a number uniquely identifying the requested A/V content. In 803, the distribution server sets an index to the content identification. In 804, the distribution server obtains standard pricing and a price modification algorithm corresponding to the requested A/V content. The pricing and modification algorithm are stored in a memory of the distribution server.

In 805, the distribution server requests the client for its identification. The client identification may be the serial number of the client computer or the IP address of its network interface card, or it may be an identification of a requesting party. In that case, the identification may be a credit card number, an electronic signature or biometric data of the individual. In 806, the client either complies or refuses to comply with identification request. If the client refuses to provide the identification, then in 807, the distribution server indicates to the client that the requested A/V content is not available unless the requested identification is provided. Then jumping to 819, the distribution server tears down the connection with the client to end the session. On the other hand, if the client complies and provides the requested identification, then in 808, the distribution server checks to see if there is a record of the client identification in a piracy history database such as 606 in FIG. 6.

If there is such a record, then in 811, the distribution server obtains a price modification parameter from the piracy history database that indicates a history of unauthorized copying of previously provided A/V content to that client identification. On the other hand, if there is no record of the client identification in the database, then in 809, the distribution server sets up a record for that client identification in the database. In 810, the distribution server next sets the counters in the database for that client identification to zero. The distribution server would then perform 811. In this case, however, the price modification parameter should be zero since it is a first record for that client identification.

In 812, the distribution server applies the price modification parameter to the standard pricing and price modification algorithm to obtain modified pricing for the requested content. In 813, the distribution server provides the modified pricing to the client for approval. In 814, if the client does not return an approval, then the distribution server jumps to 819, and tears down the connection to the client to end the session. On the other hand, if the client returns an approval, then in 815, the distribution server obtains the requested selection of A/V content from its memory, and in 816, provides the client identification, the content identification, and the requested A/V content to an ID embedder such as 604 in FIG. 6.

In 817, the ID embedder embeds the client and content identifications into a copy of the requested A/V content. The ID embedder is a program that can be run on the distribution server, or on another computer so as to free up the distribution server to perform other important tasks. When performed by another computer, the distribution server may periodically poll the other computer to determine whether the ID embedding function has been completed. A steganographic or watermarking technique is used for the embedding of the identifications into the copy of the requested A/V content. After the embedding function is completed, then in 818, the distribution server provides an electronic copy of the A/V content with embedded identifications to the client. In 819, the distribution server then tears down the connection with the client and ends the session.

The method 800 is employed by the distribution server system 600 to directly distribute A/V content. Modification of the method 800 to indirectly distribute A/V content such as performed by distribution server system 700 is straightforward. For the indirect distribution of A/V content, in addition to requesting, receiving, checking the piracy history of, and embedding the content and client identifications, a consumer identification is also requested, received, checked for piracy history, and embedded in the copy of the requested A/V content provided to the consumer.

Detection Server

Figure 9:
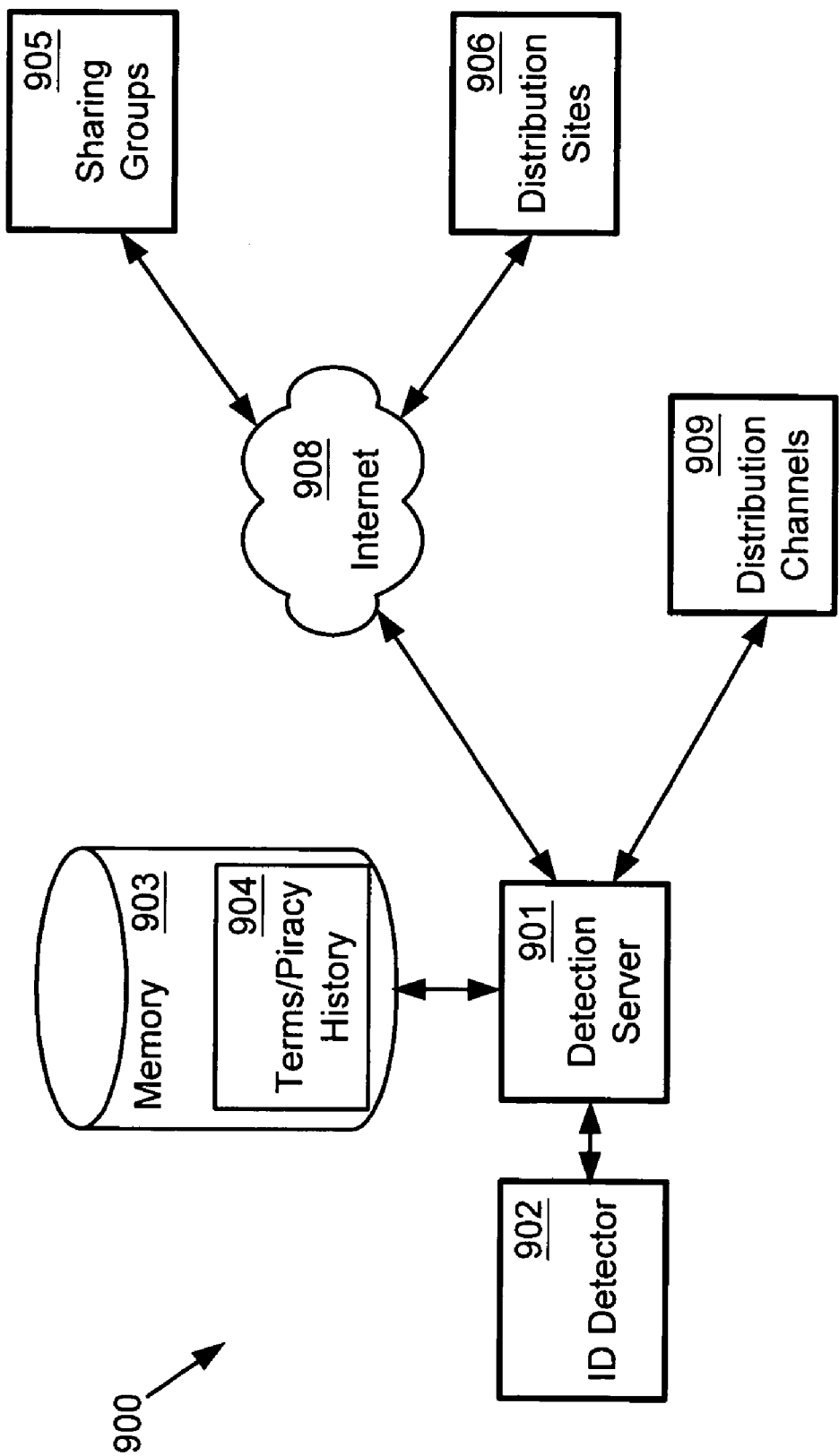
FIG. 9 illustrates, as an example, a block diagram a detection server system for generating a database of unauthorized copying of A/V content, utilizing aspects of the present invention.

FIG. 9 illustrates a detection server system 900 for generating a database 904 of unauthorized copying of A/V content such as that distributed by the distribution server systems 600 of FIG. 6 and 700 of FIG. 7. A detection server 901 processes A/V content sampled from the Internet 908 and other distribution channels 909 to generate information for the database 904. Although A/V content is sampled in this example from both the Internet 908 and non-Internet distribution channels 909, in certain applications it may be appropriate to sample from one or the other, but not both.

The detection server system 900 may also be employed to generate the databases 606 of FIG. 6 and 706 of FIG. 7.

Figure 1:
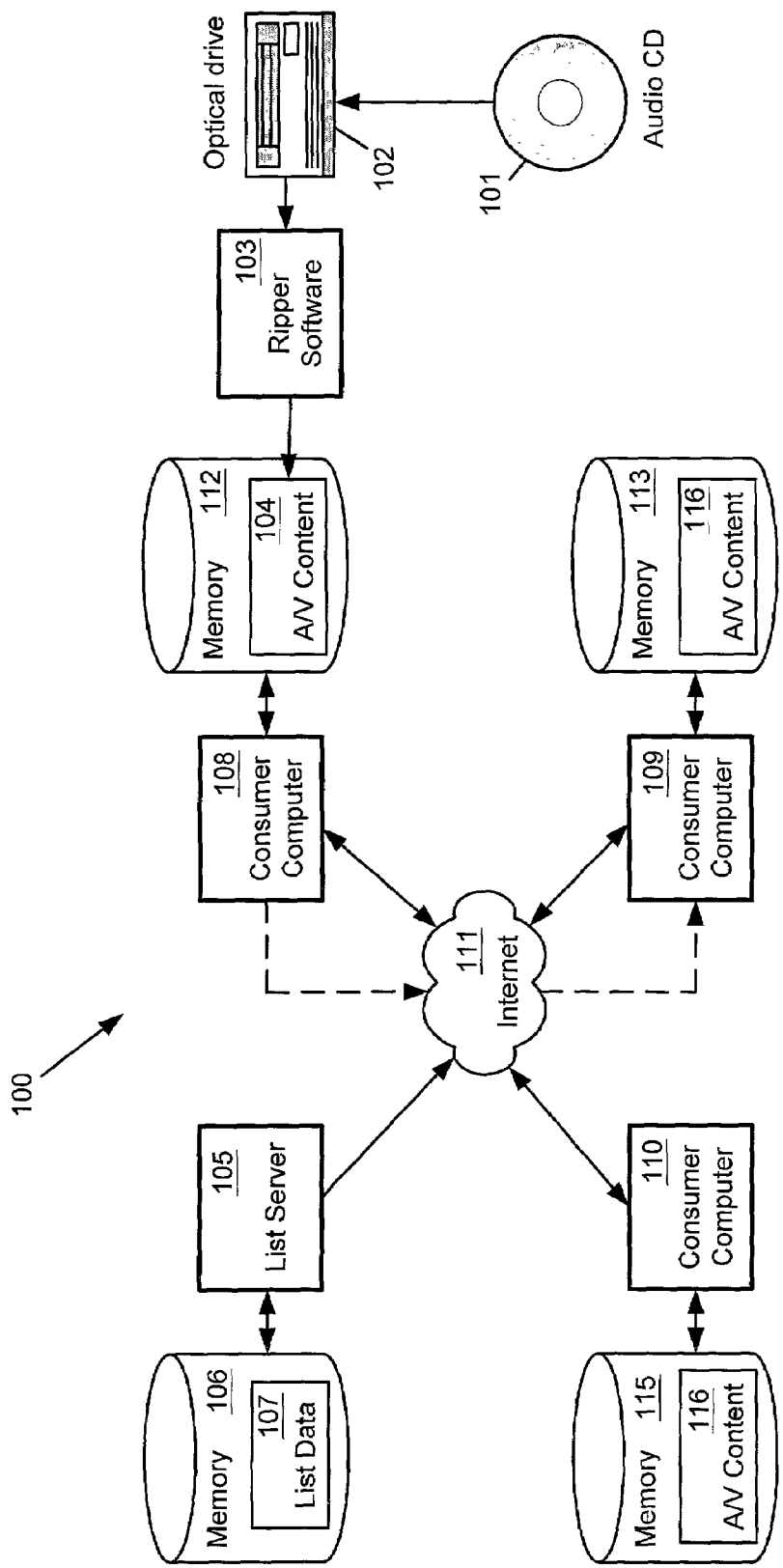
FIG. 1 illustrates, as an example, a block diagram of a Napster virtual network.
Figure 2:
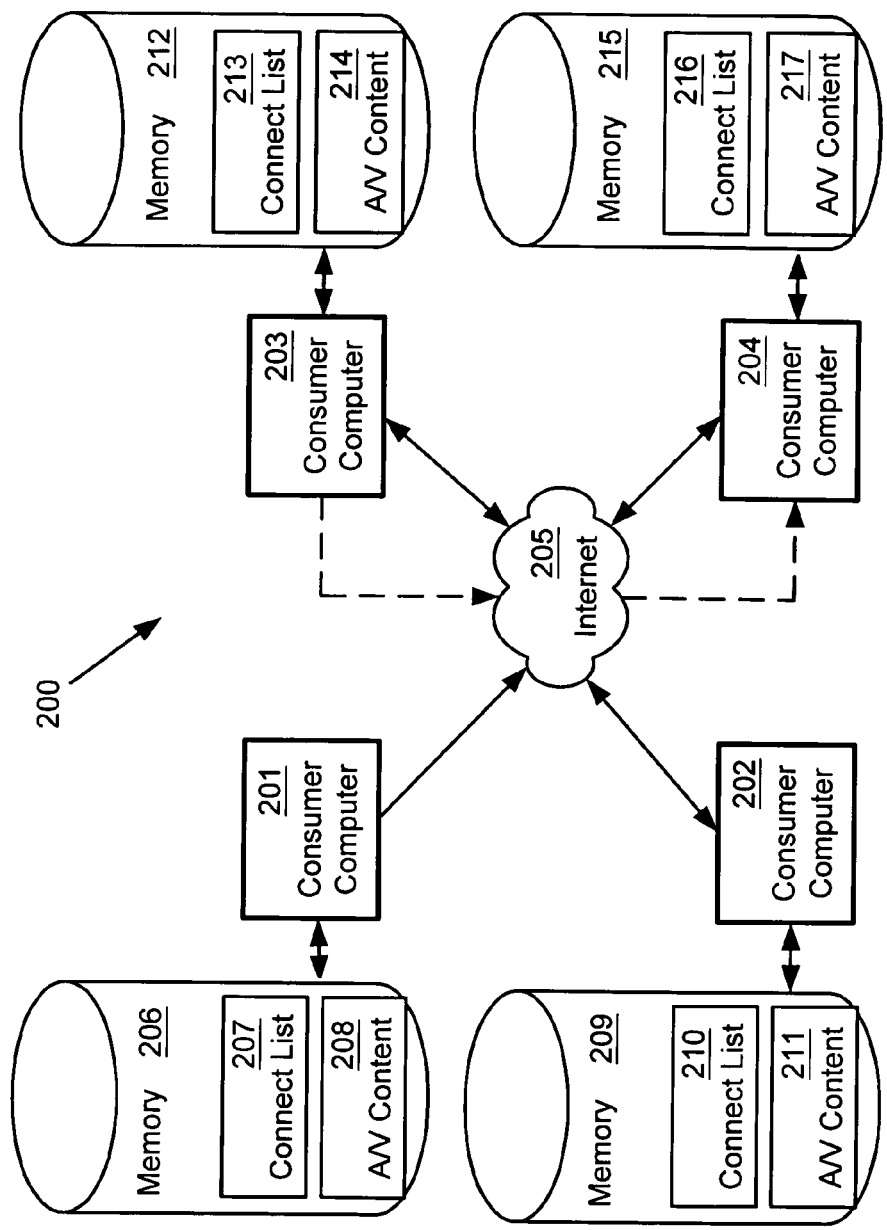
FIG. 2 illustrates, as an example, a block diagram of a Gnutella virtual network.
Figure 3:
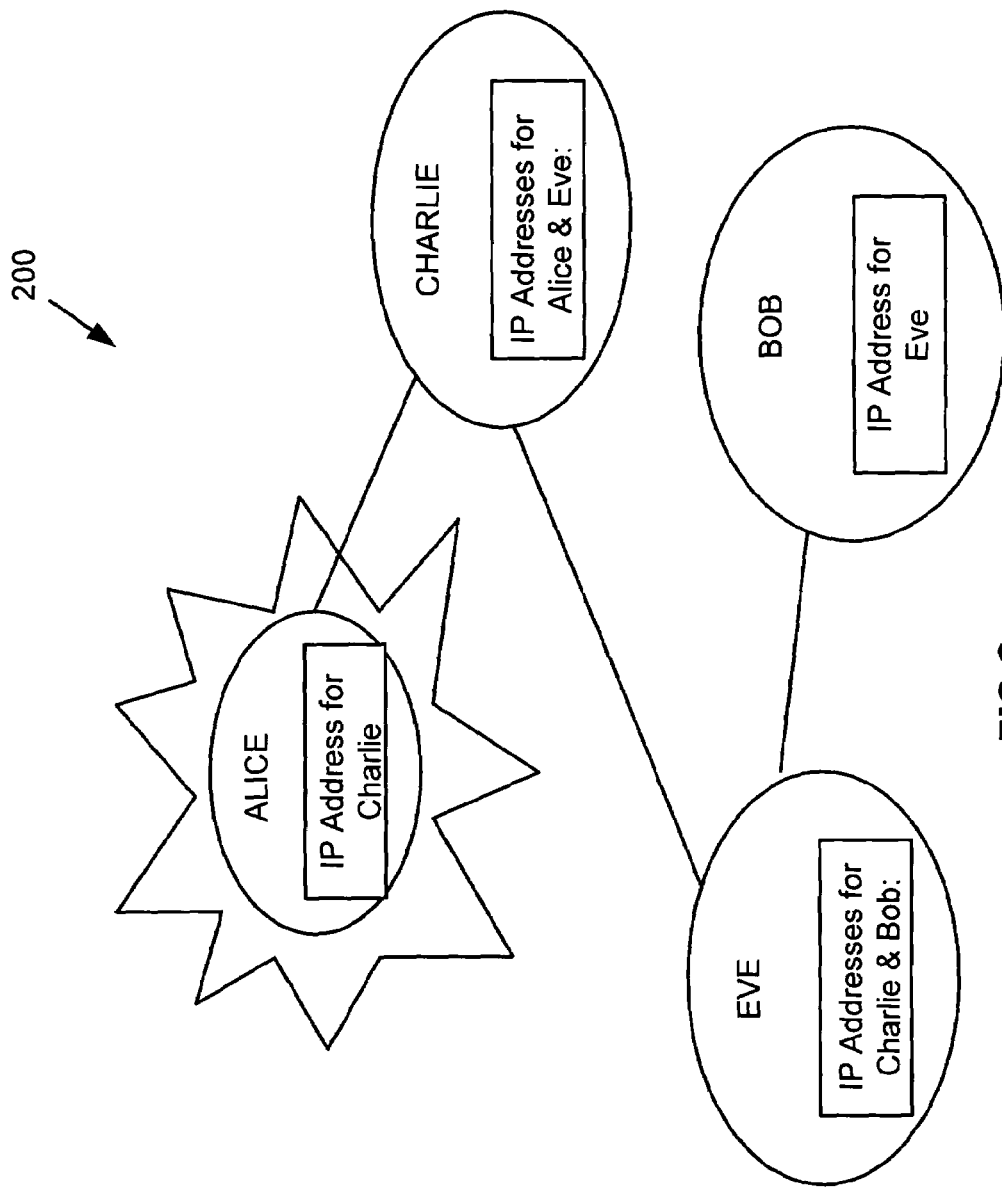
FIG. 3 illustrates, as an example, a network diagram of a Gnutella virtual network.
Figure 4:
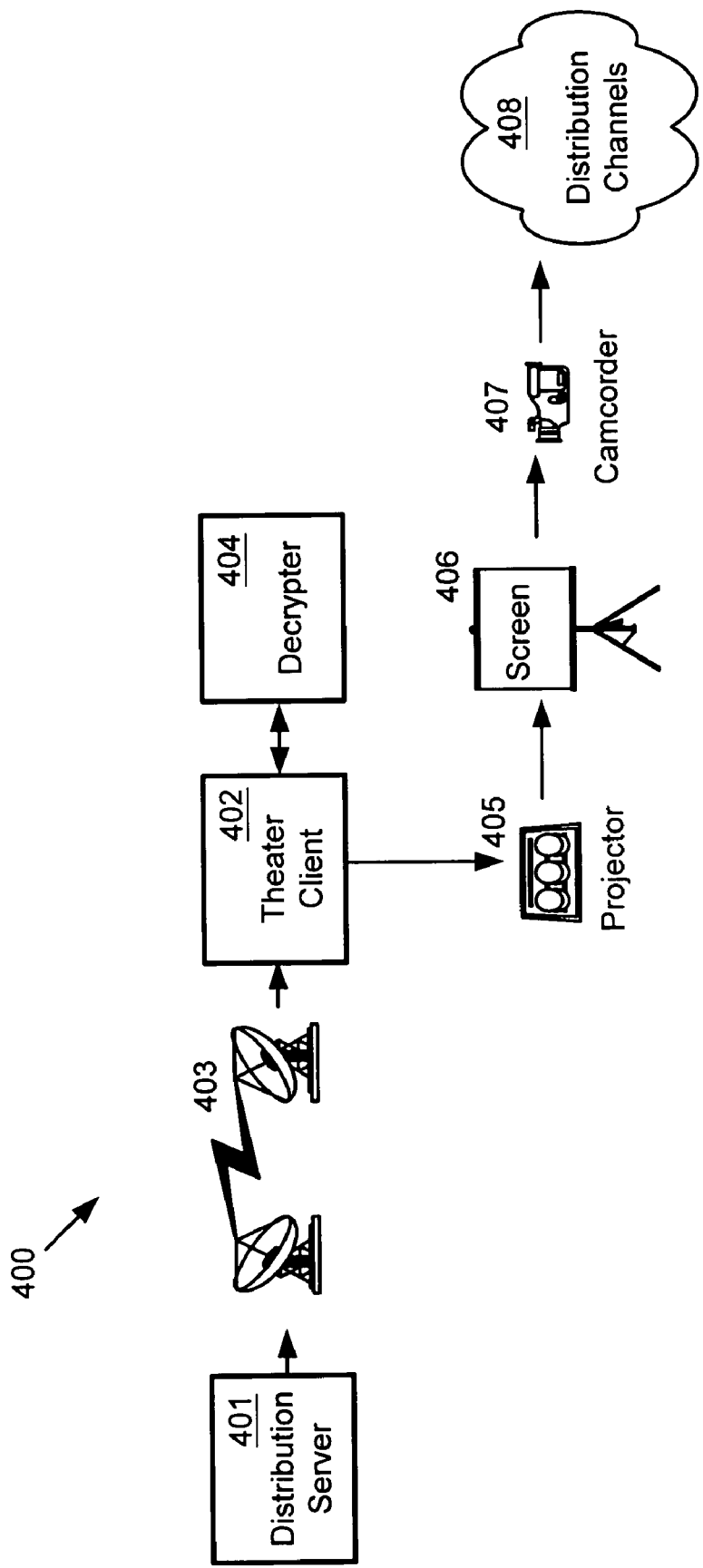
FIG. 4 illustrates, as an example, a block diagram of a digital theater system.
Figure 5:
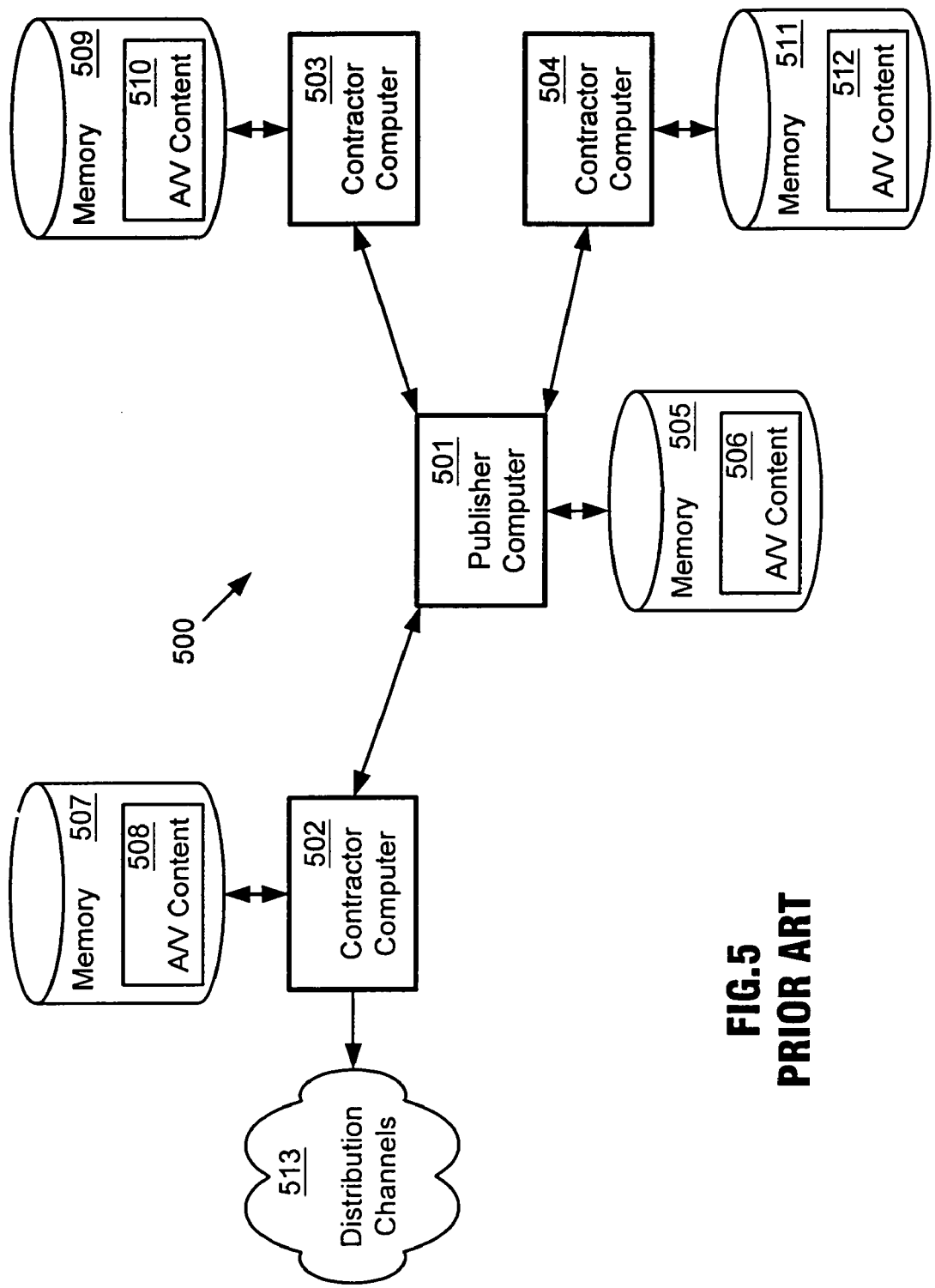
FIG. 5 illustrates, as an example, a block diagram of a distributed work environment.

The detection server 901 samples A/V content over the Internet 908 in this example from sharing groups 905 and distribution sites 906. Typical types of sharing groups 905 include the Napster virtual network 100 of FIG. 1 and the Gnutella virtual network 200 of FIG. 2. To sample A/V content from such sharing groups 905, the detection server 901 participates as a member of the group such as consumer computer 109 in the Napster virtual network 100 or consumer computer 204 in the Gnutella virtual network 200. It should be appreciated that the behavior of the detection server 901 during such sampling must fit within a profile typical of consumer computers in such groups in order to ensure that suspicions are not aroused by its downloading activities. Failure to maintain a profile similar to a typical consumer computer in such groups could result in the other consumer computers, in the case of the Gnutella virtual network 200, or the list server, in the case of the Napster virtual network 100, "banning" the detection server 901 from the sharing group. In such a situation, it may be necessary for the detection server 901 to dynamically alter its identity to ensure its on-going ability to perform sampling.

Examples of Internet distribution sites 906 include on-line store sites, on-line auction sites, and other Internet sites with collections of A/V content available for sale or trade. On the other hand, examples of non-Internet distribution channels 909 include typical distribution channels used for distributing pirated materials such as flea markets, and typical retail distribution channels such as bricks-and-mortar type stores. Whereas sampling of A/V content from the Internet results in procuring samples in electronic form, sampling of A/V content from non-Internet distribution channels 909 typically result in procuring samples of A/V content in magnetic or optical media form such as tape, CD or DVD. In this latter case, a digital tape, CD or DVD player first reads the A/V content and passes it in electronic form to the detection server 901 for processing.

Each sample of A/V content received by the detection server 901 preferably has an identification of the A/V content and an identification of the original recipient of the A/V content embedded in it. To protect the embedded identifications from being easily located in the A/V content and stripped off by copyright pirates, steganographic or watermarking techniques are employed to permanently embed the identifications in the A/V content. ID embedder 604 of distribution server system 600 described in reference to FIG. 6 and ID embedder 704 of distribution server system 700 described in reference to FIG. 7 are two means of embedding such information in the A/V content.

After the detection server 901 receives a sampled copy of A/V content, it passes the copy to an ID detector 902 to read the embedded content and recipient identifications. The ID detector 902 employs a decryption algorithm that is related to the steganographic or watermarking technique originally employed to embed the identifications into the A/V content. Since the decryption algorithm uses information of where and how the identifications are embedded in the A/V content, it is straightforward for the decryption algorithm to separate the embedded identifications from the underlying A/V content.

The detection server 901 then updates information stored in the database 904 with the content and recipient identifications extracted by the ID detector 902 from the sampled copy of A/V content. A record including the content and recipient identifications for the A/V content was previously created in the database 904 by a distribution server system such as the distribution server system 600 of FIG. 6 or the distribution server system 700 of FIG. 7 at the time a copy of the A/V content was first distributed to the recipient corresponding to the recipient identification. The detection server 901 updates that record with the extracted content and recipient identification by incrementing a counter in the record. The only exception to such incrementing is when the detection server 901 detects a first sampling of a hard copy of A/V content that was transferred such as CD or DVD 608 of FIG. 6 or 710 of FIG. 7. Since the original hard copy of the A/V content is freely transferable, the first sampling is not counted since it may be that original copy. The resulting count of the counter in the record therefore represents the number of unauthorized copies detected of the identified content and recipient.

By collecting a large body of information in the database 904, a price or terms adjustment to the standard pricing for subsequent purchases of A/V content by recipients in record can provide incentives or penalties for unauthorized copying of prior received A/V content based on things such as:

The volume of unauthorized copying detected.
The geographical dispersion of the unauthorized copies.
The variety of titles unlawfully distributed by a recipient.
The variety of media types on which unauthorized copies of A/V content is detected (i.e., Internet only, CD only, both, etc.).
The lack of any history of unauthorized copying attributed to a recipient.

Figure 10:
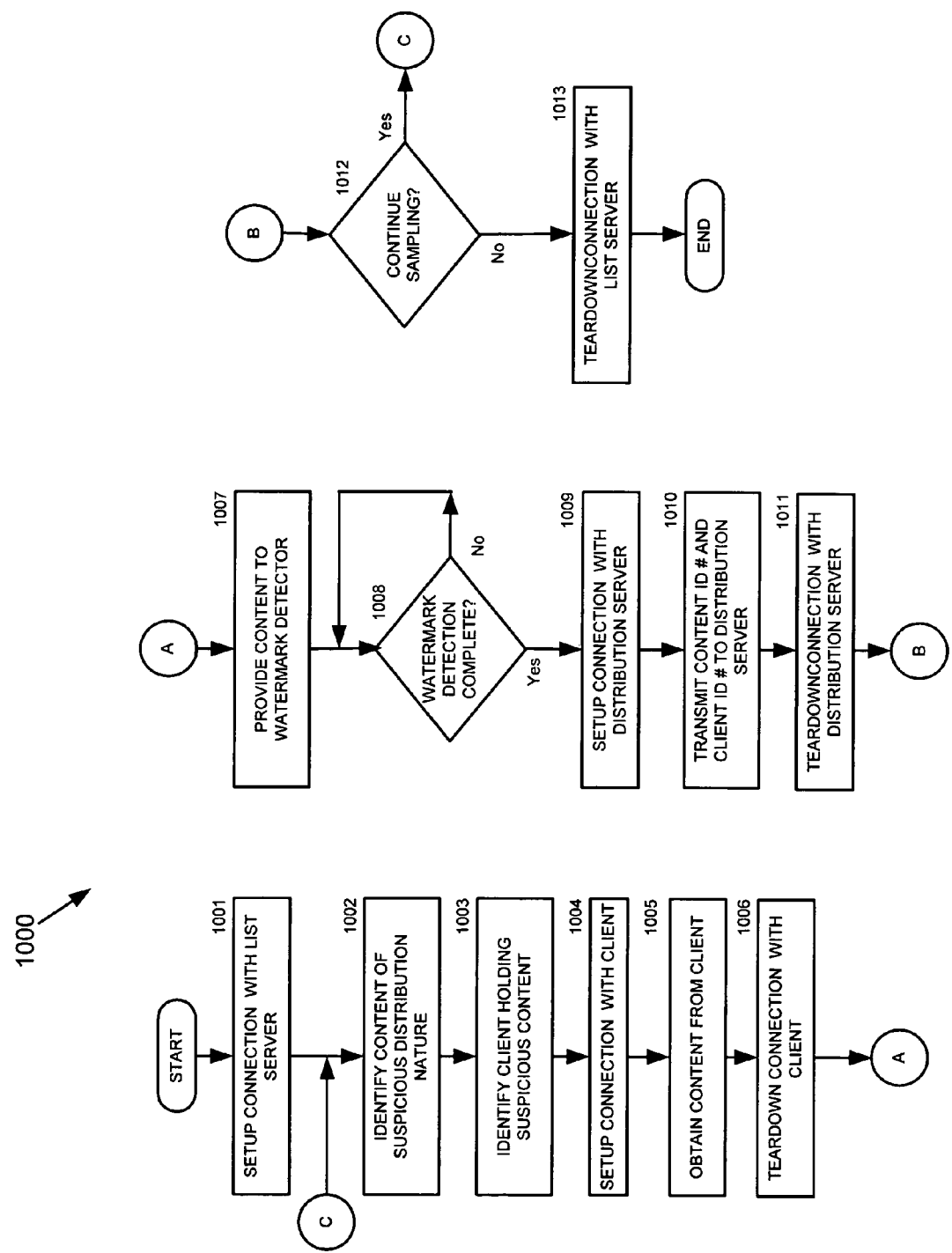
FIG. 10 illustrates, as an example, a flow diagram of a method of generating a database of unauthorized copying of protected material, utilizing aspects of the present invention.

FIG. 10 illustrates a flow diagram of a method 1000 of generating a database of unauthorized copying of protected material. In the example, a detection server such as 901 of FIG. 9 samples A/V content available from a Napster virtual network such as 100 of FIG. 1. Modifications of the method to sample other sharing groups such as described in reference to 905 of FIG. 9 and distribution sites such as described in reference to 906 of FIG. 9 are straightforward. Also, modification of the method to process samples received from non-Internet distribution channels such as described in reference to 909 of FIG. 9 is also straightforward.

In 1001, the detection server sets up a connection with the Napster list server. In 1002, the detection server reads the list of A/V content available from various consumer computers (also referred to simply as "clients") in the Napster virtual network, and identifies one title of A/V content of suspicious distribution nature. The identification in this case may simply result from the fact that the title is known to be a hotly pirated piece of A/V content. On the other hand, the identification may result from complex statistical analysis of the list data. In 1003, the detection server then identifies a consumer computer holding the identified suspicious A/V content. The identification in this case may be based on a "first on the list" basis, or the identification may be based upon a consumer computer's past history of unauthorized copying as found in prior records of the database that the detection server is generating. In this latter case, it would be necessary to associate the consumer computers with recipient identifications in the records of the database.

In 1004, the detection server sets up a connection with the identified consumer computer. The connection is made possible by connecting to the address provided on the list from the list server. In 1005, the detection server obtains a copy of the identified A/V content from the identified consumer computer, and in 1006, the detection server then tears down the connection with the identified consumer computer.

In 1007, the detection server provides the obtained copy of the A/V content to an ID detector (also referred to simply as a "watermark detector" in this example) such as described in reference to 902 of FIG. 9. In 1008, the detection server periodically checks whether the ID detector has completed its task of reading the content and original recipient identifications embedded in the A/V content. Upon completion, in 1009, the detection server sets up a connection with a distribution server such as described in reference to 601 in FIG. 6 or 701 in FIG. 7. In 1010, the detection server then transmits the content and recipient identifications to the distribution server so that the distribution server, in this case, may update the database of unauthorized copying. In 1011, the detection server then tears downs the connection with the distribution server. In 1012, the detection server determines whether it should continue sampling A/V content from the Napster list. If the answer is yes, then the detection server jumps back to 1002. On the other hand, if the answer is no, then in 1013, the detection server tears down the connection with the list server and ends its session.

Distribution/Detection System

Currently operating digital theater systems utilize a physical mail system with hard drives to distribute encrypted and compressed movies for subsequent projection by a digital projector. Digital projectors have been proposed, demonstrated or deployed which are based on either a digital micromirror device (Texas Instruments) or light amplifiers (Hughes-JVC). In the future, it is anticipated that distribution of content to these digital theaters could occur by satellite, fiber optic cables, microwave, magnetic tape media or optical media. It is generally accepted that digital theater systems must provide a variety of security features to include encryption.

Figure 11:
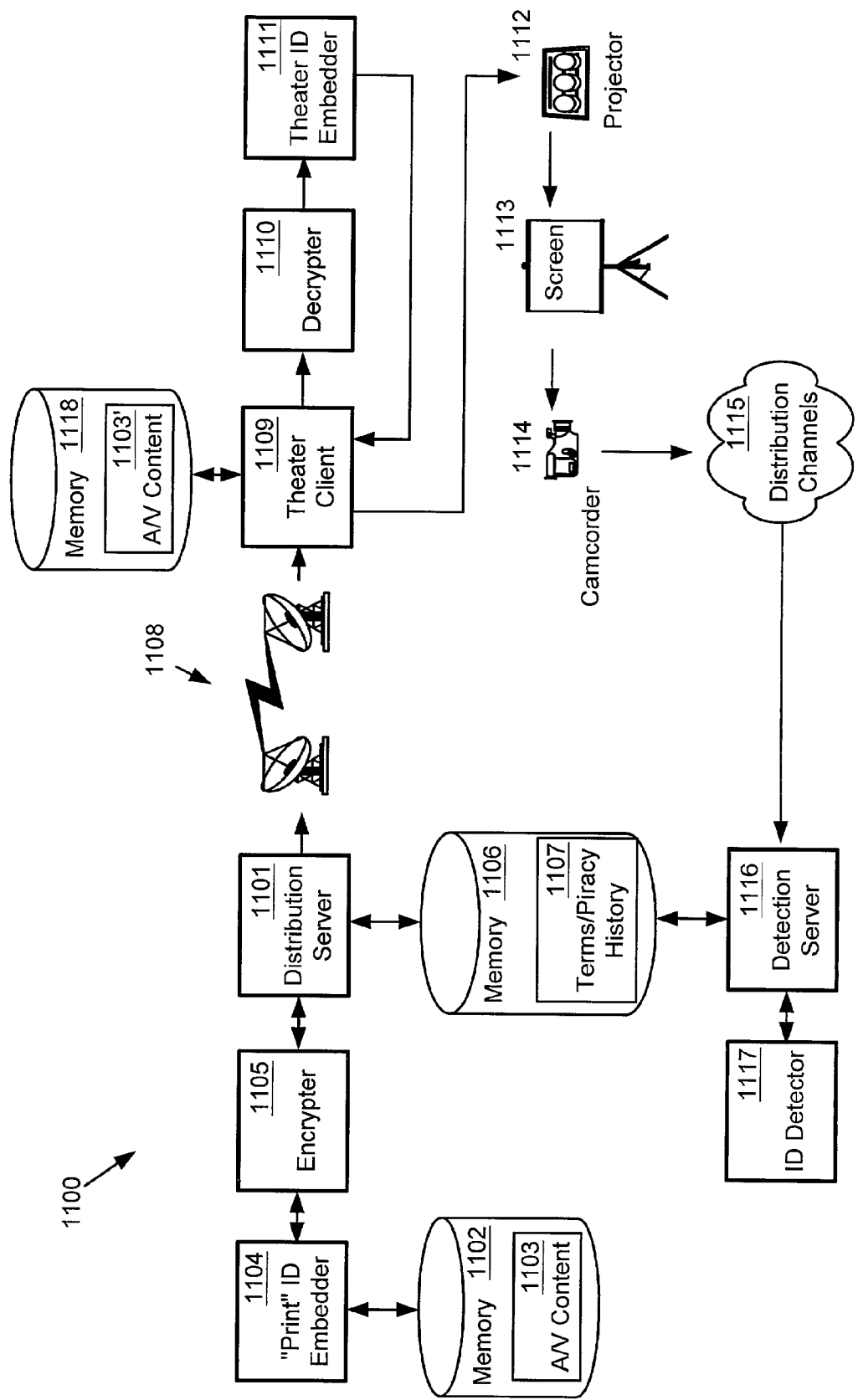
FIG. 11 illustrates, as an example, a system for distributing A/V content to digital theaters and detecting unauthorized copying of such A/V content, utilizing aspects of the present invention.

FIG. 11 illustrates a system 1100 for distributing A/V content to a digital theater system and detecting unauthorized copying of such A/V content. In this example, the system 1100 includes four major subsystems: a distribution server subsystem, a digital theater subsystem, a pirate subsystem, and a detection server subsystem.

The distribution server subsystem includes a distribution server 1101 for controlling the distribution process, a memory 1102 for storing A/V content 1103 that is to be distributed, an ID embedder 1104 for embedding a content identification into each copy of the A/V content 1103 that is distributed, an encrypter 1105 for encrypting each copy of the A/V content 1103 that is distributed, and a memory 1106 for storing a database 1107 including information on unauthorized copying of previously distributed A/V content. The memories 1102 and 1106 may be the same or different mass storage devices. Terms for the distribution include standard pricing and a pricing adjustment algorithm stored in memory 1106. Alternatively, such terms could also be stored in memory 1104. The pricing adjustment algorithm depends on information of unauthorized copying of A/V content previously distributed to the digital theater system. The A/V content 1103 in this case is a digital movie, and the content identification for the digital movie is a "print" number. Encryption of the copy prior to transmission ensures a secure transmission. The distribution server 1101 controls the ID embedder 1104 and the encrypter 1105, and transmits the encrypted copy of the A/V content 1103' under terms determined from information in the database 1107 over the transmission path 1108 to the digital theater subsystem.

The digital theater subsystem includes a theater client computer 1109 for controlling the presentation process, a memory 1118 for storing the encrypted A/V content 1103' received from the distribution server subsystem, a decrypter 1110 for decrypting the stored copy of A/V content 1103', an ID embedder 1111 for embedding a recipient identification in the decrypted copy of A/V content 1103, a digital projector 1112 for projecting images from the processed A/V content 1103, and a screen 1113 for displaying the projected images to an audience.

The theater client computer 1109 controls the presentation process so that at the appropriate time for playing the digital movie, it retrieves the encrypted A/V content 1103' from the memory 1118, causes the decrypter 1110 to decrypt the encrypted A/V content 1103', causes the ID embedder 1111 to embed the recipient identification in the decrypted copy of the A/V content 1103, and causes the digital projector 1112 to project images from the thus processed A/V content 1103. The recipient identification in this case is a number or code that uniquely identifies, for example, the theater, the projector, and the date and time of projection. The embedding employs a steganographic or watermarking technique. Since the embedding is persistent and transparent to the human psycho-visual system, its presence does not interfere with the enjoyment of viewing the movie.

The pirate subsystem simply includes a camcorder 1114 that a pirate uses to record an unauthorized copy of the A/V content 1103 from the screen 1113 ("pirated copy"), and distribution channels 1115 for distributing copies of the pirated copy. When the pirate records the movie off the screen 1113, however, the pirated copy will still include the "Print ID", "Theater ID", "Projector ID" and date and time stamp information embedded within it.

The detection server subsystem samples A/V content distributed through distribution channels 1115, detects unauthorized copies of the A/V content 1103, and provides information for such unauthorized copies to the distribution server 1101 so that it can update the database 1107 with such information. An example of such a detection server subsystem is described in reference to 900 of FIG. 9, where the detection server 1116 and the ID detector 1117 in FIG. 11 perform the functions of their respective counterparts 901 and 902 of FIG. 9.

Figure 12:
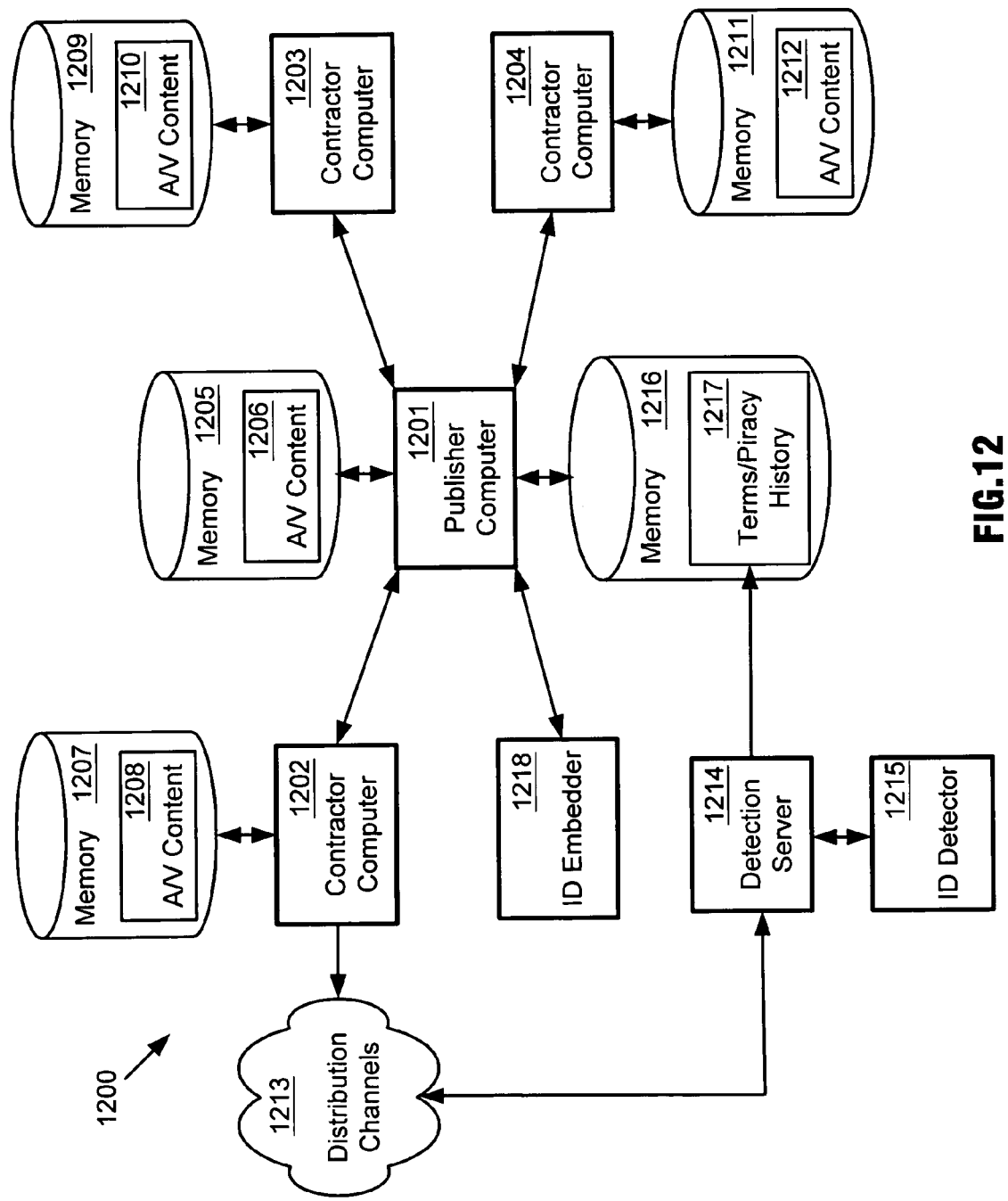
FIG. 12 illustrates, as an example, a system for distributing A/V content to contractors and detecting unauthorized copying of such A/V content, utilizing aspects of the present invention.

FIG. 12 illustrates a system 1200 for distributing A/V content 1206, or portions thereof, in a post-production system to contractors 1202, 1203 and 1204, and detecting unauthorized copying of such distributed A/V content through distribution channels 1213. In conventional post-production work, a number of different contractors bid on providing specific audio or video production services. Based on a number of factors including the reputation of the bidders and their bid prices, a publisher or content producer will select a contractor to provide certain services. The system 1200 is an improvement over such conventional approach since it maintains a history of unauthorized copying attributed to various contractors in a database 1217, and employs a terms algorithm or formula depending on such history to adjust the contractor bids to determine the awardees.

To illustrate operation of the system 1200 by example, three different contractors are shown (represented by contractor computers 1202, 1203 and 1204) that have placed bids with the publisher (represented by publisher computer 1201). In the first instance, contractors 1202 and 1203 are awarded the contract for producing certain types of work on the A/V content 1206. Accordingly, the publisher 1201 distributes a copy of the A/V content 1206 to each contractor with that contractor's identification embedded in the copy by ID embedder 1218. The embedding employs a steganographic or watermarking technique. In the course of providing the agreed upon services, the contractor 1202, however, inappropriately releases the A/V content 1206 to a pirate duplication and distribution system (represented by distribution channels 1213).

By sampling the distribution channels 1213 for copies of A/V content 1206, and providing the sampled A/V content to the detection server 1214, the identity of the contractor that inappropriately released the copy of A/V content 1206 can be established by the ID detector 1215 which reads the embedded contractor identification from the sampled copy of A/V content 1206. Upon establishing the identity of the contractor, the detection server 1214 can update information in database 1217 that is referred to as the "Bid Structure Database." For subsequent bid negotiations, the publisher computer 1201 functioning as a distribution server such as 601 of FIG. 6 uses the information on each of the contractor's history of re-distributing content as an element in awarding those subsequent contracts. For instance, the publisher computer 1201 could require contractors that have inappropriately released copies of A/V content previously distributed to them to provide a bid of less then 10% of the other two bidders before considering awarding these subsequent contracts to that contractor. Alternatively, the publisher computer 1201 could automatically remove the redistributing contractor from consideration for subsequent bids. If all contractors had some history of re-distributing content, then various algorithms could be employed to value this history in the bid evaluation process.

Although the various aspects of the invention have been described with respect to preferred embodiments, it will be understood that the invention is entitled to full protection within the full scope of the appended claims. For example, in addition to the examples described herein, there are many other applications of the distribution server system, the detection server system, and systems combining the distribution and detection server systems. One such application is, for example, in-flight entertainment. Also, the A/V content being electronically distributed by the distribution server may be distributed as files that can be stored for future replay by the recipient computer system, or it may be distributed as streaming media for a single play on the recipient computer system such as in a "pay-for-view" scheme. All of these and other possibilities suggested by the described examples are to be considered within the full scope of the present invention.

I claim:

1. A computer implemented method for distributing protected material, comprising:
   ascertaining terms for providing a protected material to a prospective recipient according at least in part to information of unauthorized copying of other protected material previously provided to said prospective recipient; and
   providing or withholding a copy of said protected material to said prospective recipient in accordance with said ascertained terms.

2. The method according to claim 1, wherein said ascertaining further includes obtaining said information of unauthorized copying from a database.

3. The method according to claim 1, wherein said providing comprises providing a copy of said protected material to said prospective recipient in the form of a file.

4. The method according to claim 1, wherein said providing comprises providing a copy of said protected material to said prospective recipient in the form of streaming media.

5. The method according to claim 4, wherein said protected material includes audio-visual content.

6. The method according to claim 5, further comprising embedding an identification of said protected material in said copy prior to providing said copy to said prospective recipient.

7. The method according to claim 5, further comprising embedding an identification of said prospective recipient in said copy prior to providing said copy to said prospective recipient.

8. The method according to claim 7, wherein said embedding employs a steganographic technique.

9. The method according to claim 7, wherein said embedding employs a watermarking technique.

10. The method according to claim 7, wherein said identification of said prospective recipient includes a credit card number of said prospective recipient.

11. The method according to claim 7, wherein said identification of said prospective recipient includes an electronic signature of said prospective recipient.

12. The method according to claim 7, wherein said identification of said prospective recipient includes a serial number associated with a computer of said prospective recipient.

13. The method according to claim 7, wherein said identification of said prospective recipient includes an Internet protocol address associated with a network interface card in a computer of said prospective recipient.

14. The method according to claim 7, further comprising encrypting said protected material in said copy of said protected material prior to providing said copy to said prospective recipient.

15. The method according to claim 7, wherein said ascertaining comprises determining a price for providing said protected material to said prospective recipient according to a formula and information of unauthorized copying of other protected material previously provided to said prospective recipient.

16. The method according to claim 15, further comprising receiving an identification of said protected material and said identification of said prospective recipient over the Internet, and said providing of said copy of said protected material to said prospective recipient employs the Internet.

17. The method according to claim 15, wherein said ascertaining comprises:
transmitting said identification of said prospective recipient to a remote server; and
receiving said terms for providing said protected material to said prospective recipient back from said remote server.

18. The method according to claim 17, wherein said providing comprises:
recording said copy of said protected material on a tangible medium; and
providing said tangible medium to said prospective recipient according to said terms.

19. The method according to claim 18, wherein said tangible medium is a compact disc.

20. The method according to claim 18, wherein said tangible medium is a digital versatile disc.

21. An apparatus for distributing protected material, comprising a computer having a first set of program code for:
ascertaining terms for providing a protected material to a prospective recipient according at least in part to information of unauthorized copying of other protected material previously provided to said prospective recipient; and
providing or withholding a copy of said protected material to or from said prospective recipient in accordance with said ascertained terms.

22. The apparatus according to claim 21, wherein said ascertaining further includes obtaining said information of unauthorized copying from a database.

23. The apparatus according to claim 21, wherein said providing comprises providing a copy of said protected material to said prospective recipient in the form of a file.

24. The apparatus according to claim 21, wherein said providing comprises providing a copy of said protected material to said prospective recipient in the form of streaming media.

25. The apparatus according to claim 24, wherein said protected material includes audio-visual content.

26. The apparatus according to claim 25, wherein said computer has a second set of program code for embedding an identification of said protected material in said copy prior to providing said copy to said prospective recipient.

27. The apparatus according to claim 26, wherein said computer has a second set of program code for embedding an identification of said prospective recipient in said copy prior to providing said copy to said prospective recipient.

28. The apparatus according to claim 27, wherein said embedding employs a steganographic technique.

29. The apparatus according to claim 27, wherein said embedding employs a watermarking technique.

30. The apparatus according to claim 27, wherein said identification of said prospective recipient includes a credit card number of said prospective recipient.

31. The apparatus according to claim 27, wherein said identification of said prospective recipient includes an electronic signature of said prospective recipient.

32. The apparatus according to claim 27, wherein said identification of said prospective recipient includes a serial number associated with a computer of said prospective recipient.

33. The apparatus according to claim 27, wherein said identification of said prospective recipient includes an Internet protocol address associated with a network interface card in a computer of said prospective recipient.

34. The apparatus according to claim 27, wherein said computer has a third set of program code for encrypting said protected material in said copy prior to providing said copy to said prospective recipient.

35. The apparatus according to claim 27, wherein said ascertaining comprises determining a price for providing said protected material to said prospective recipient according to a formula and information of unauthorized copying of other protected material previously provided to said prospective recipient.

36. The apparatus according to claim 35, wherein said first set of program code is further for receiving an identification of said protected material and said identification of said prospective recipient over the Internet, and said providing of said copy of said protected material to said prospective recipient employs the Internet.

37. The apparatus according to claim 35, wherein said ascertaining comprises:
transmitting said identification of said prospective recipient to a remote server; and
receiving said terms for providing said protected material to said prospective recipient back from said remote server.

38. The apparatus according to claim 37, wherein said providing comprises:

recording said copy of said protected material on a tangible medium; and providing said tangible medium to said prospective recipient according to said terms.

39. The apparatus according to claim 38, wherein said tangible medium is a compact disc.

40. The apparatus according to claim 38, wherein said tangible medium is a digital versatile disc.

41. A computer implemented method for generating a database of unauthorized copying of protected material, comprising:

detecting at least one identification embedded in a copy of protected material procured from a distribution channel; and storing information of said protected material according to said at least one identification in a database so as to be indicative of unauthorized copying of said protected material.

42. The method according to claim 41, wherein said at least one identification includes a content identification identifying said protected material, and a recipient identification identifying a recipient of said protected material.

43. The method according to claim 42, wherein said at least one identification has been embedded in said protected material by a steganographic technique.

44. The method according to claim 42, wherein said at least one identification has been embedded in said protected material by a watermarking technique.

45. The method according to claim 42, wherein said protected material includes audio-visual content.

46. The method according to claim 45, wherein said recipient is an original purchaser of said copy of said protected material.

47. The method according to claim 46, wherein said recipient identification is a credit card number of said original purchaser.

48. The method according to claim 45, wherein said recipient is an independent contractor involved in post-production work on said protected material.

49. The method according to claim 45, further comprising procuring said copy of said protected material over the Internet.

50. The method according to claim 49, wherein said procuring comprises:

contacting a list server; and downloading a copy of a selected protected material from an on-line client identified by said list server.

51. The method according to claim 49, wherein said procuring comprises:

searching for a selected protected material; and downloading a coy of said selected protected material from an on-line client identified as a result of said searching.

52. An apparatus for generating a database of unauthorized copying of protected material, comprising a computer having a first set of program code for:

detecting at least one identification embedded in a copy of protected material procured from a distribution channel; and storing information of said protected material according to said at least one identification in a database so as to be indicative of unauthorized copying of said protected material.

53. The apparatus according to claim 52, wherein said at least one identification includes a content identification identifying said protected material, and a recipient identification identifying a recipient of said protected material.

54. The apparatus according to claim 53, wherein said at least one identification has been embedded in said protected material by a steganographic technique.

55. The apparatus according to claim 53, wherein said at least one identification has been embedded in said protected material by a watermarking technique.

56. The apparatus according to claim 53, wherein said protected material includes audio-visual content.

57. The apparatus according to claim 56, wherein said recipient is an original purchaser of a copy of said protected material.

58. The apparatus according to claim 57, wherein said recipient identification is a credit card number of said original purchaser.

59. The apparatus according to claim 56, wherein said recipient is an independent contractor involved in post-production work on said protected material.

60. The apparatus according to claim 56, wherein said computer has a second set of program code for procuring said protected material over the Internet.

61. The apparatus according to claim 60, wherein said procuring comprises:

contacting a list server; and downloading a copy of a selected protected material from an on-line client identified by said list server.

62. The apparatus according to claim 60, wherein said procuring comprises:

searching for a selected protected material; and downloading a copy of said selected protected material from an on-line client identified as a result of said searching.

63. An apparatus for distributing protected material, comprising:

a detection server having a first program for detecting identifications embedded in copies of protected materials procured from at least one distribution channel, and storing information of said protected materials according to said identifications in a database so as to be indicative of unauthorized copying of said protected material; and a distribution server having a second program for ascertaining terms for providing a protected material to a prospective recipient according at least in part to said information in said database, and providing or withholding a copy of said protected material to said prospective recipient in accordance with said ascertained terms.

64. The apparatus according to claim 63, wherein said protected material includes audio-visual content.

65. The apparatus according to claim 64, wherein said distribution server has a third program for embedding an identification of said protected material in said copy prior to providing said copy to said prospective recipient.

66. The apparatus according to claim 65, wherein said third program is further for embedding an identification of said recipient in said copy prior to providing said copy to said prospective recipient.

67. The apparatus according to claim 66, wherein said embedding employs a steganographic technique.

68. The apparatus according to claim 66, wherein said embedding employs a watermarking technique.

69. The apparatus according to claim 64, wherein said ascertaining comprises determining a price for providing said protected material to said prospective recipient according to a formula and said information in said database.

70. The apparatus according to claim 69, wherein said second program is further for receiving a content identification of said protected material and a recipient identification of said prospective recipient over the Internet, and said providing of said copy employs the Internet.

71. The apparatus according to claim 64, wherein said detection server has a fourth program for procuring said protected material from at least one distribution channel over the Internet.

72. The apparatus according to claim 71, wherein said procuring comprises:

contacting a list server; and
downloading selected protected materials from online clients identified by said list server.

73. The apparatus according to claim 71, wherein said procuring comprises:

searching for selected protected materials; and
downloading said selected protected materials from on-line clients identified as a result of said searching.

* * * * *